(12) United States Patent
Samuelian

(10) Patent No.: US 10,023,220 B1
(45) Date of Patent: Jul. 17, 2018

(54) CART SKI SYSTEM

(71) Applicant: Avedis Samuelian, Jackson Heights, NY (US)

(72) Inventor: Avedis Samuelian, Jackson Heights, NY (US)

(*) Notice: Subject to any disclaimer, the term of this patent is extended or adjusted under 35 U.S.C. 154(b) by 0 days.

(21) Appl. No.: 15/596,602

(22) Filed: May 16, 2017

(51) Int. Cl.
*B62B 13/18* (2006.01)
*B62B 7/04* (2006.01)

(52) U.S. Cl.
CPC .......... *B62B 13/18* (2013.01); *B62B 7/04* (2013.01); *B62B 2207/02* (2013.01)

(58) Field of Classification Search
CPC ........ B62B 13/18; B62B 7/04; B62B 2207/02
USPC .......................................................... 280/13
See application file for complete search history.

(56) References Cited

U.S. PATENT DOCUMENTS

| | | | | |
|---|---|---|---|---|
| 154,120 A * | 8/1874 | Brooks | ................ | B62B 19/02 280/13 |
| 304,621 A * | 9/1884 | Deetz | ................ | B62B 19/02 280/13 |
| 791,343 A * | 5/1905 | Holtman | ................ | B62B 19/02 280/13 |
| 970,874 A * | 9/1910 | Beffel | ................ | B62B 19/02 280/13 |
| 1,034,749 A * | 8/1912 | Westman | ................ | B62B 19/02 280/13 |
| 1,123,800 A * | 1/1915 | Robertson | ................ | B62B 19/02 280/13 |
| 1,154,991 A * | 9/1915 | Johnson | ................ | B62B 19/02 280/13 |
| 1,207,856 A * | 12/1916 | Carlisle | ................ | B62B 19/02 188/32 |
| 1,233,792 A * | 7/1917 | Kendrick | ................ | B62B 13/18 280/9 |
| 1,326,724 A * | 12/1919 | Grebenstein | ................ | B62B 19/02 280/13 |
| 1,328,715 A * | 1/1920 | Clein | ................ | B62B 9/04 280/13 |
| 1,330,644 A * | 2/1920 | Matson | ................ | B62B 13/043 280/14.21 |
| 1,349,311 A * | 8/1920 | Asman | ................ | B62B 13/18 280/8 |
| 1,445,219 A * | 2/1923 | Arsonan | ................ | B62B 13/18 280/14.28 |
| 1,453,722 A * | 5/1923 | Nuoffer | ................ | B62B 19/02 280/13 |
| 1,472,880 A * | 11/1923 | Mahr | ................ | B62B 19/02 280/13 |
| 1,493,912 A * | 5/1924 | White | ................ | B62B 13/18 280/11 |
| 1,507,528 A * | 9/1924 | Suominen | ................ | B62B 19/02 280/13 |
| 1,657,534 A * | 1/1928 | Gingold | ................ | B62B 19/02 280/13 |

(Continued)

*Primary Examiner* — James A Shriver, II
*Assistant Examiner* — Brian L Cassidy

(57) ABSTRACT

A cart ski system for urging a cart along a granular support surface includes a cart that may be rolled along a support surface. The cart has a set of rear wheels and a set of front wheels. A pair of skis is provided and each of the wheels is positioned in a corresponding one of the skis. Each of the skis slides along the support surface when the support surface is comprised of a granular material thereby enhancing urging the cart along the granular material.

7 Claims, 4 Drawing Sheets

(56) References Cited

U.S. PATENT DOCUMENTS

| | | | | |
|---|---|---|---|---|
| 1,694,215 A * | 12/1928 | Boleslaw | ............... | B62B 19/02 |
| | | | | 180/183 |
| 1,733,774 A * | 10/1929 | Edvin | ................... | B62B 19/02 |
| | | | | 280/13 |
| 2,199,153 A * | 4/1940 | Else | .................... | A63C 9/0807 |
| | | | | 280/615 |
| 2,352,966 A * | 7/1944 | Morando | ............... | B62B 19/02 |
| | | | | 280/13 |
| 2,428,994 A * | 10/1947 | Rogers | .................. | B62B 13/18 |
| | | | | 280/11 |
| 2,443,699 A * | 6/1948 | Swain | .................... | B62B 19/02 |
| | | | | 280/13 |
| D188,679 S * | 8/1960 | D'Atri | ........................ | D2/627 |
| 4,139,208 A * | 2/1979 | Kaley | ................... | B62B 13/18 |
| | | | | 280/9 |
| 4,161,323 A * | 7/1979 | Wetteland | ............ | A63C 5/031 |
| | | | | 280/13 |
| 4,167,270 A * | 9/1979 | Laplaca | ................ | B62B 13/18 |
| | | | | 280/8 |
| 4,479,657 A | 10/1984 | Reynolds | | |
| D313,377 S | 1/1991 | Anderson | | |
| 5,407,217 A | 4/1995 | Lambert et al. | | |
| 5,996,259 A * | 12/1999 | Galley | ................ | A63C 13/006 |
| | | | | 36/122 |
| 6,554,294 B2 * | 4/2003 | Laudon | .................. | B62J 11/00 |
| | | | | 280/12.14 |
| 6,682,082 B1 * | 1/2004 | Dalen | ..................... | B60P 3/36 |
| | | | | 280/10 |
| 6,708,989 B1 | 3/2004 | Braun | | |
| 6,983,943 B2 * | 1/2006 | Ouellette | ............... | B62B 13/18 |
| | | | | 280/28 |
| 7,121,560 B1 | 10/2006 | Balzano | | |
| 8,276,920 B2 | 10/2012 | Clapp | | |
| 8,851,485 B2 * | 10/2014 | Bach | ..................... | B62K 13/00 |
| | | | | 280/13 |
| 9,139,216 B1 * | 9/2015 | Rivard | .................. | B62M 27/02 |
| 2001/0038192 A1 * | 11/2001 | McManus | ............... | A63C 5/02 |
| | | | | 280/601 |
| 2002/0017771 A1 * | 2/2002 | McManus | ............... | A63C 5/02 |
| | | | | 280/600 |
| 2003/0234500 A1 * | 12/2003 | Roberts | .................... | A63C 5/00 |
| | | | | 280/28 |
| 2004/0231200 A1 * | 11/2004 | Forrest | ................ | A63C 13/003 |
| | | | | 36/122 |
| 2010/0289231 A1 * | 11/2010 | Huot | ........................ | B62B 9/00 |
| | | | | 280/13 |
| 2013/0181022 A1 * | 7/2013 | Bogoslofski | .............. | A45F 5/00 |
| | | | | 224/250 |
| 2013/0214500 A1 * | 8/2013 | Love | ...................... | B62K 27/003 |
| | | | | 280/13 |
| 2013/0277925 A1 * | 10/2013 | Bysiewicz | ............. | B62B 13/18 |
| | | | | 280/13 |
| 2013/0313794 A1 * | 11/2013 | Bach | ..................... | B62B 19/02 |
| | | | | 280/13 |

\* cited by examiner

CART SKI SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to ski devices and more particularly pertains to a new ski device for urging a cart along a granular support surface.

BRIEF SUMMARY OF THE INVENTION

An embodiment of the disclosure meets the needs presented above by generally comprising a cart that may be rolled along a support surface. The cart has a set of rear wheels and a set of front wheels. A pair of skis is provided and each of the wheels is positioned in a corresponding one of the skis. Each of the skis slides along the support surface when the support surface is comprised of a granular material thereby enhancing urging the cart along the granular material.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
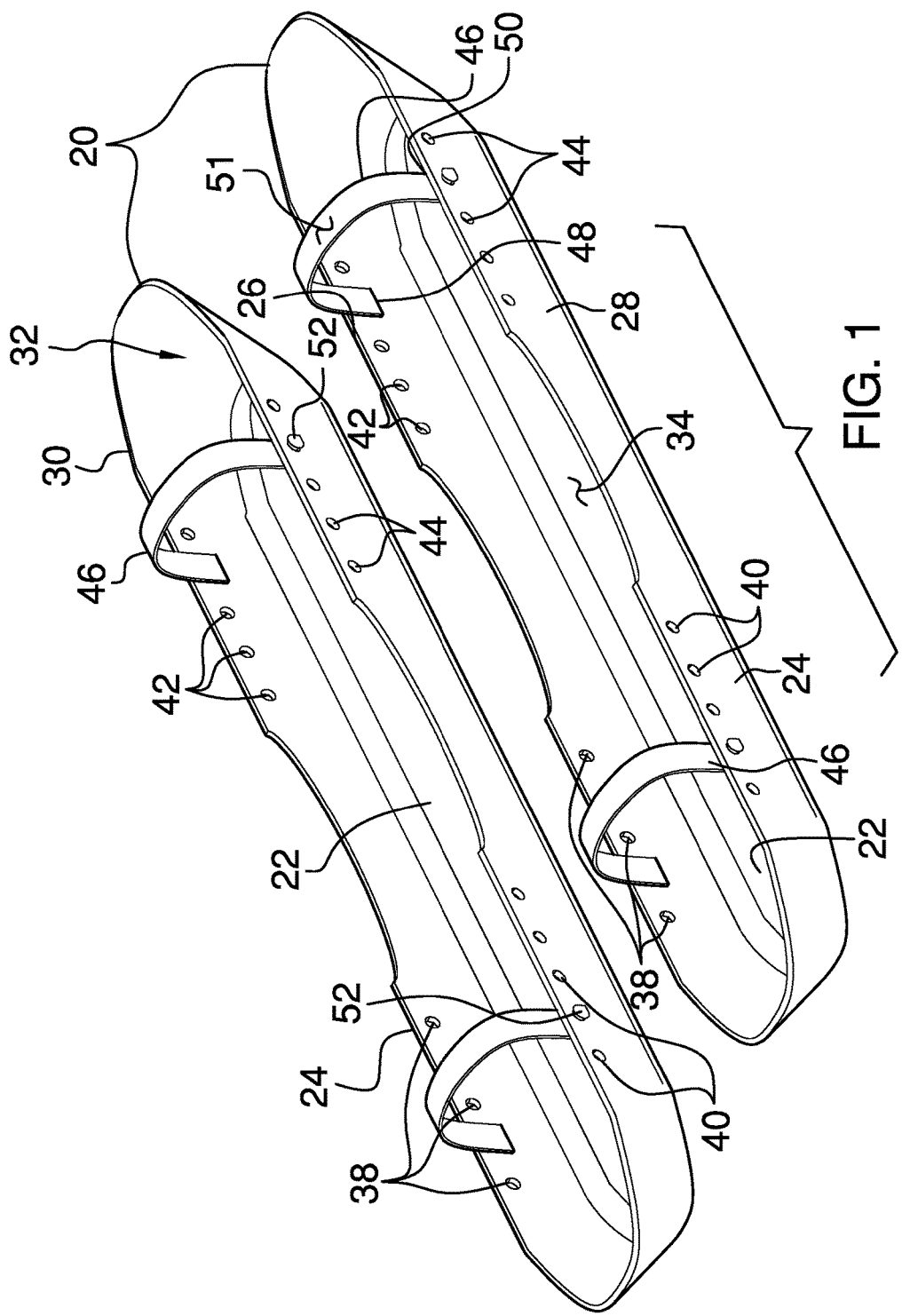
FIG. 1 is a top perspective view of a cart ski system according to an embodiment of the disclosure.
Figure 2:
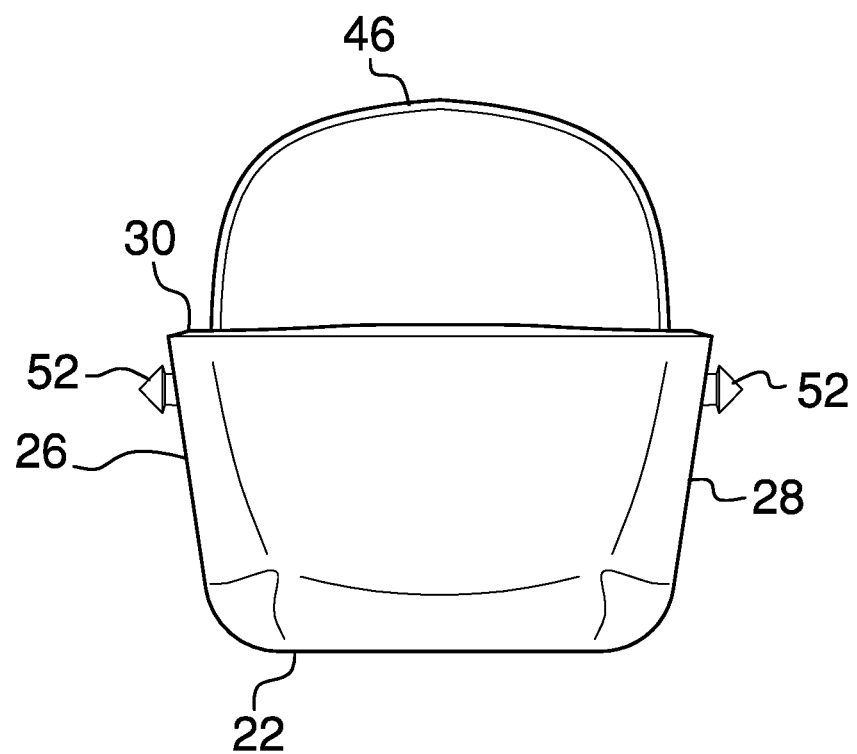
FIG. 2 is a back view of an embodiment of the disclosure.
Figure 3:
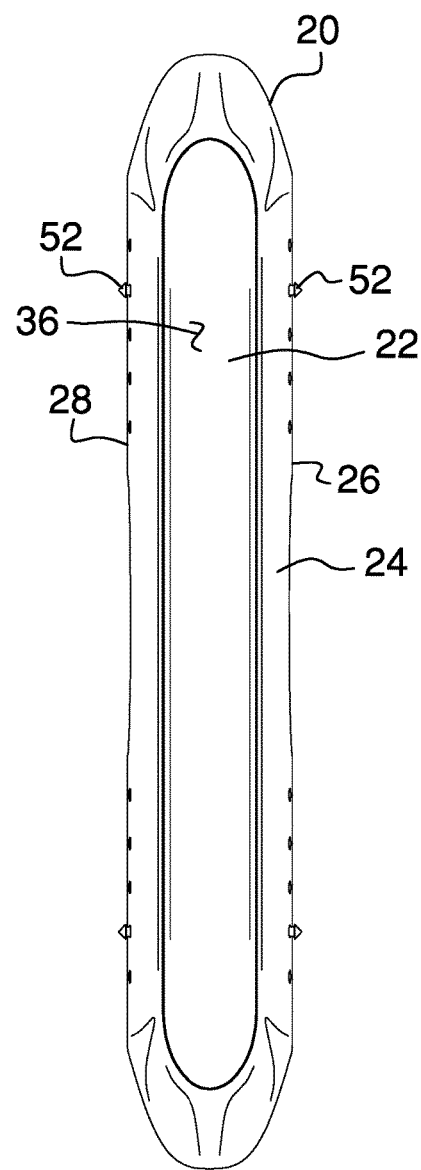
FIG. 3 is a bottom view of an embodiment of the disclosure.
Figure 4:
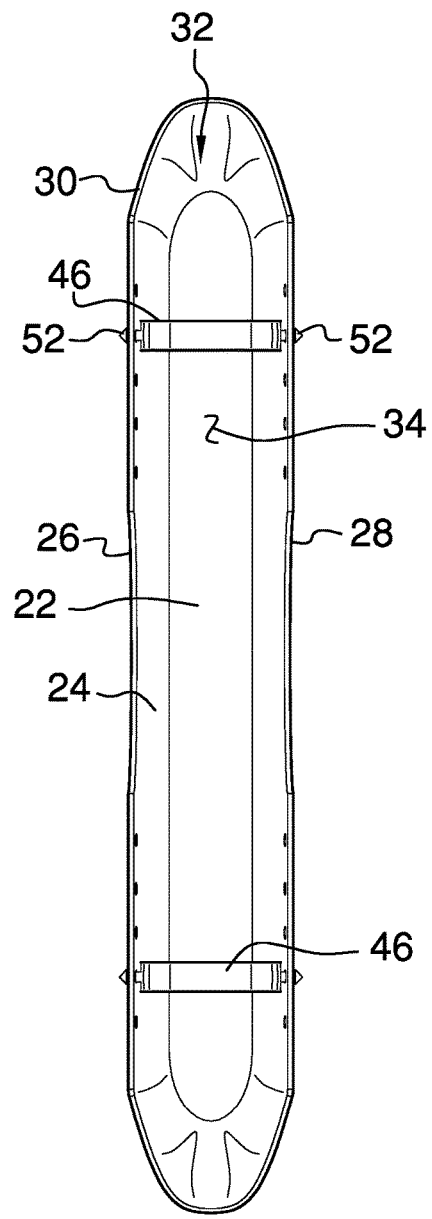
FIG. 4 is a top view of an embodiment of the disclosure.
Figure 5:
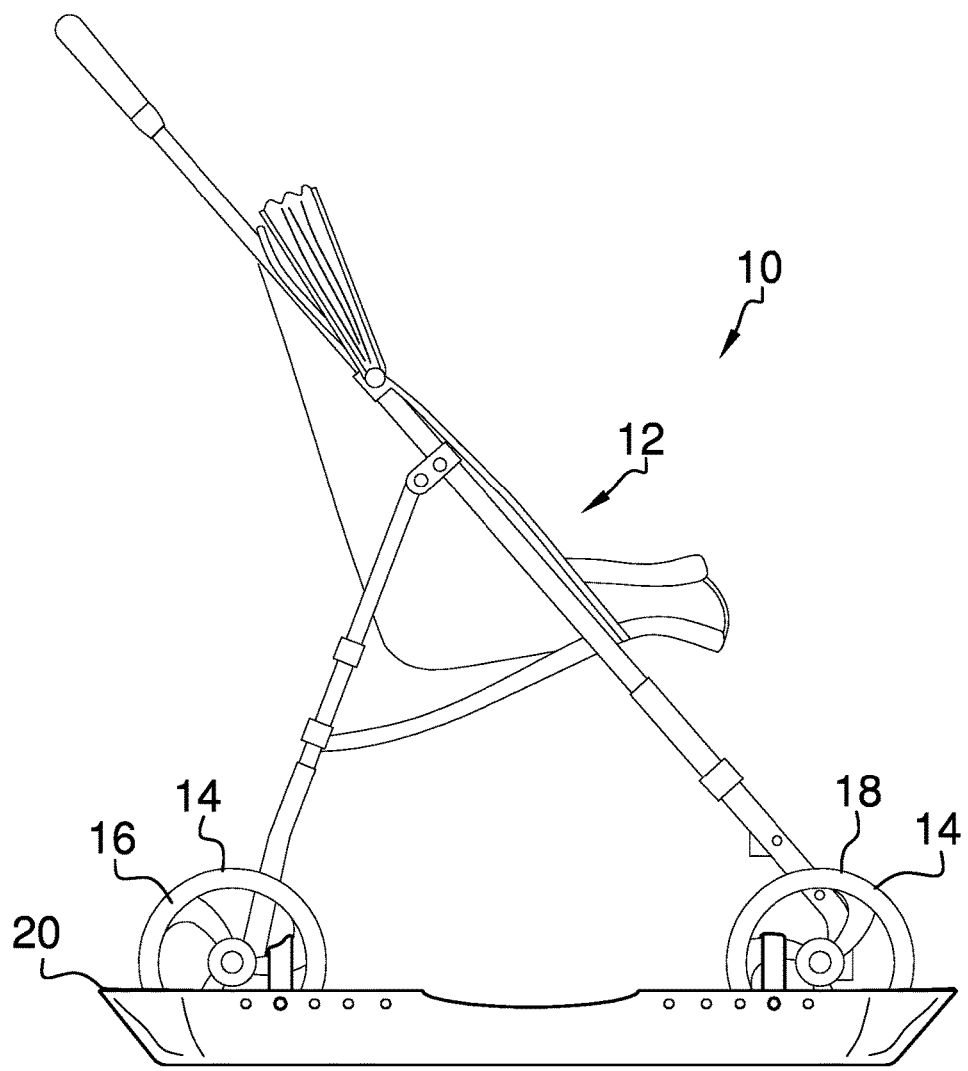
FIG. 5 is a perspective in-use view of an embodiment of the disclosure.

With reference now to the drawings, and in particular to FIGS. 1 through 5 thereof, a new ski device embodying the principles and concepts of an embodiment of the disclosure and generally designated by the reference numeral 10 will be described.

As best illustrated in FIGS. 1 through 5, the cart ski system 10 generally comprises a cart 12 that is selectively rolled along a support surface 13. The cart 12 has a plurality of wheels 14 and the plurality of wheels 14 comprises a set of rear wheels 16 and a set of front wheels 18. The cart 12 may be a baby stroller or any other wheeled cart 12. A pair of skis 20 is provided and each of the skis 20 has corresponding ones of the wheels 14 positioned therein. Moreover, each of the skis 20 slides along the support surface 13 when the support surface 13 is comprised of a granular material thereby enhancing urging the cart 12 along the granular material. The granular material may be sand on a beach or other granular material into which the wheels 14 would otherwise sink.

Each of the skis 20 has a basal wall 22 and a perimeter wall 24 extending upwardly therefrom. The perimeter wall 24 has a first lateral side 26, a second lateral side 28 and a distal edge 30 with respect to the basal wall 22 to define an opening 32 in each of the skis 20. Each of the skis 20 is longitudinally elongated such that each of the skis 20 has a length that is greater than a length between the rear wheels 16 and the front wheels 18. The perimeter wall 24 slopes outwardly from the basal wall 22 to frictionally engage the granular material thereby inhibiting the skis 20 from sinking in the granular material.

The basal wall 22 has a first surface 34 and a second surface 36, and an associated one of the rear wheels 16 and the front wheels 18 is positioned on the first surface 34. The second surface 36 frictionally engages the support surface 13. The first lateral side 26 corresponding to each of the skis 20 has a plurality of first apertures 38 extending therethrough. The first apertures 38 are spaced apart from each other and are distributed adjacent to the distal edge 30.

The second lateral side 28 corresponding to each of the skis 20 has a plurality of second apertures 40 extending therethrough. The second apertures 40 are spaced apart from each other and are distributed adjacent to the distal edge 30. Each of the second apertures is aligned with an associated one of the first apertures 38. The first lateral side 26 corresponding to each of the skis 20 has a plurality of third apertures 42 extending therethrough. The third apertures 42 are spaced apart from each other and are distributed adjacent to the distal edge 30. Additionally, the plurality of third apertures 42 is spaced from the plurality of first apertures 38.

The second lateral side 28 corresponding to each of the skis 20 has a plurality of fourth apertures 44 extending therethrough. The fourth apertures 44 are spaced apart from each other and are distributed adjacent to the distal edge 30. Each of the fourth apertures 44 is aligned with an associated one of the third apertures 42.

A plurality of straps 46 is provided and each of the straps 46 releasably engages an associated one of the skis 20. Each of the straps 46 engages an associated one of the wheels 14 on the cart 12 such that each of the straps 46 retains the skis 20 on the cart 12. Each of the straps 46 has a first end 48, a second end 50 and a first surface 51 extending therebetween. A plurality of knobs 52 is provided and each of the knobs 52 is coupled to the first surface 51 of a corresponding one of the straps 46. Moreover, each of the knobs 52 is aligned with an associated one of the first 48 and second 50 ends of the corresponding strap 46. Each of the knobs 52 is extended through a selected one of the first 38, second 40, third 42 and fourth 44 apertures such that each of the straps 46 is retained to form an arch extending between the first 26 and second 28 lateral sides of the corresponding strap 46. Each of the straps 46 engages an associated one of the wheels 14 on the cart 12 to retain each of the skis 20 on the cart 12. Additionally, the straps 46 on each of the skis 20 is spaced a selected distance away from each other to accommodate spacing between the front 18 and rear 16 wheels on the cart 12.

In use, the cart 12 is positioned on each of the skis 20 having each of the front 18 and rear 16 wheels lying on the first surface 34 of the corresponding ski. Each of the straps 46 is manipulated to engage the associated wheel 14 and the knobs 52 on the straps 46 are extended through a selected one of the first 38, second 40, third 42 and fourth 44 apertures. In this way each of the skis 20 is coupled to the cart 12. The cart 12 is urged along the support surface 13 and each of the skis 20 glides along the support surface 13. Thus, the cart 12 is movable along sand and other granular material without the wheels 14 sinking into the granular material.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cart ski system comprising:
    a cart being configured to be rolled along a support surface, said cart having a plurality of wheels, said plurality of wheels comprising a set of rear wheels and a set of front wheels;
    a pair of skis, each of said skis having corresponding ones of said wheels being positioned therein wherein each of said skis is configured to slide along the support surface when the support surface is comprised of a granular material thereby enhancing urging said cart along the granular material, each of said skis having a plurality of first, second, third and fourth apertures, each of said skis having a perimeter wall having a first lateral side and a second lateral side;
    a plurality of straps, each of said straps releasably engaging an associated one of said skis, each of said straps engaging an associated one of said wheels on said cart such that each of said straps retains said skis on said cart, each of said straps having a first end, a second end and a first surface extending therebetween; and
    a plurality of knobs, each of said knobs being coupled to said first surface of a corresponding one of said straps, each of said knobs being aligned with an associated one of said first and second ends of said corresponding strap, each of said knobs being extended through a selected one of said first, second, third and fourth apertures such that each of said straps is retained to form an arch extending between said first and second lateral sides of said corresponding strap, each of said straps engaging an associated one of said wheels on said cart to retain each of said skis on said cart.

2. The system according to claim 1, wherein each of said skis has a basal wall and said perimeter wall extending upwardly therefrom, said perimeter wall having a distal edge with respect to said basal wall to define an opening in each of said skis, each of said skis being longitudinally elongated such that each of said skis has a length being greater than a length between said rear wheels and said front wheels, said perimeter wall sloping outwardly from said basal wall wherein said perimeter wall is configured to frictionally engage the granular material thereby inhibiting said skis from sinking in the granular material.

3. The system according to claim 2, wherein said basal wall has a first surface and a second surface, said first surface having an associated one of said rear wheels and said front wheels being positioned thereon, said second surface being configured to frictionally engage the support surface, said first lateral side corresponding to each of said skis having said plurality of first apertures extending therethrough, said first apertures being spaced apart from each other and being distributed adjacent to said distal edge.

4. The system according to claim 3, wherein said second lateral side corresponding to each of said skis has said plurality of second apertures extending therethrough, said second apertures being spaced apart from each other and being distributed adjacent to said distal edge, each of said second apertures being aligned with an associated one of said first apertures.

5. The system according to claim 2, wherein said first lateral side corresponding to each of said skis has said plurality of third apertures extending therethrough, said third apertures being spaced apart from each other and being distributed adjacent to said distal edge, said plurality of third apertures being spaced from said plurality of first apertures.

6. The system according to claim 5, wherein said second lateral side corresponding to each of said skis has said plurality of fourth apertures extending therethrough, said fourth apertures being spaced apart from each other and being distributed adjacent to said distal edge, each of said fourth apertures being aligned with an associated one of said third apertures.

7. A cart ski system comprising:
- a cart being configured to be rolled along a support surface, said cart having a plurality of wheels, said plurality of wheels comprising a set of rear wheels and a set of front wheels; and
- a pair of skis, each of said skis having corresponding ones of said wheels being positioned therein wherein each of said skis is configured to slide along the support surface when the support surface is comprised of a granular material thereby enhancing urging said cart along the granular material, each of said skis having a basal wall and a perimeter wall extending upwardly therefrom, said perimeter wall having a first lateral side, a second lateral side and a distal edge with respect to said basal wall to define an opening in each of said skis, each of said skis being longitudinally elongated such that each of said skis has a length being greater than a length between said rear wheels and said front wheels, said perimeter wall sloping outwardly from said basal wall wherein said perimeter wall is configured to frictionally engage the granular material thereby inhibiting said skis from sinking in the granular material, said basal wall having a first surface and a second surface, said first surface having an associated one of said rear wheels and said front wheels being positioned thereon, said second surface being configured to frictionally engage the support surface, said first lateral side corresponding to each of said skis having a plurality of first apertures extending therethrough, said first apertures being spaced apart from each other and being distributed adjacent to said distal edge, said second lateral side corresponding to each of said skis having a plurality of second apertures extending therethrough, said second apertures being spaced apart from each other and being distributed adjacent to said distal edge, each of said second apertures being aligned with an associated one of said first apertures, said first lateral side corresponding to each of said skis having a plurality of third apertures extending therethrough, said third apertures being spaced apart from each other and being distributed adjacent to said distal edge, said plurality of third apertures being spaced from said plurality of first apertures, said second lateral side corresponding to each of said skis having a plurality of fourth apertures extending therethrough, said fourth apertures being spaced apart from each other and being distributed adjacent to said distal edge, each of said fourth apertures being aligned with an associated one of said third apertures;
- a plurality of straps, each of said straps releasably engaging an associated one of said skis, each of said straps engaging an associated one of said wheels on said cart such that each of said straps retains said skis on said cart, each of said straps having a first end, a second end and a first surface extending therebetween, and
- a plurality of knobs, each of said knobs being coupled to said first surface of a corresponding one of said straps, each of said knobs being aligned with an associated one of said first and second ends of said corresponding strap, each of said knobs being extended through a selected one of said first, second, third and fourth apertures such that each of said straps is retained to form an arch extending between said first and second lateral sides of said corresponding strap, each of said straps engaging an associated one of said wheels on said cart to retain each of said skis on said cart.

* * * * *